United States Patent [19]

Keogh

[11] 4,243,579

[45] Jan. 6, 1981

[54] FLAME RETARDANT ALKYLENE-ALKYL ACRYLATE COPOLYMER COMPOSITION

[75] Inventor: Michael J. Keogh, Bridgewater, N.J.

[73] Assignee: Union Carbide Corporation, New York, N.Y.

[21] Appl. No.: 944,336

[22] Filed: Sep. 21, 1978

[51] Int. Cl.³ .................................................. C08K 3/16
[52] U.S. Cl. ............................. 260/45.7 R; 106/15.05; 174/110 SR; 252/8.1; 260/23 AR; 260/28.5 AV; 260/42.57
[58] Field of Search ................. 260/23 AR, 28.5 AV, 260/40 R, 42.15, 45.7 R, 45.7 RL, 42.57; 106/15 FP, 15.05; 252/8.1; 174/110 SR

[56] References Cited

U.S. PATENT DOCUMENTS

| | | | |
|---|---|---|---|
| 3,361,705 | 1/1968 | Kay et al. | 260/37 R |
| 3,816,367 | 6/1974 | Larkin et al. | 260/45.75 B |
| 3,907,727 | 9/1975 | Lipp | 260/42.57 |
| 4,012,343 | 3/1977 | Raley | 260/28.5 AV |
| 4,067,847 | 1/1978 | Yui et al. | 260/45.7 R |
| 4,119,601 | 10/1978 | Bonnaud et al. | 260/42.55 |

Primary Examiner—Donald E. Czaja
Assistant Examiner—W. Thompson
Attorney, Agent, or Firm—James C. Arvantes

[57] ABSTRACT

A flame retardant alkylene-alkyl acrylate copolymer composition comprising alkylene-alkyl acrylate copolymer, a halogenated flame retardant additive, and at least one of calcium or magnesium oxide, carbonate, hydroxide, or sulfate.

25 Claims, No Drawings

FLAME RETARDANT ALKYLENE-ALKYL ACRYLATE COPOLYMER COMPOSITION

BACKGROUND OF THE INVENTION

1. Field of the Invention

This invention relates to a flame retardant alkylene-alkyl acrylate copolymer composition comprising alkylene-alkyl acrylate copolymer, halogenated flame retardant additive and at least one of calcium or magnesium oxide, carbonate, hydroxide, or sulfate. Also included herein is a flame retardant additive masterbatch comprising alkylene-alkyl acrylate copolymer, halogenated flame retardant additive and calcium or magnesium oxide, carbonate, hydroxide or sulfate.

2. Description of the Prior Art

It is well known that the properties of polyolefins (including copolymers thereof, such as alkylene-alkyl acrylate copolymers) particularly physical properties such as strength, moisture resistance, chemical inertness and its outstanding electrical properties, make it suitable for wire insulation, cable jacketing and other applications. However, it is known that polyolefins and copolymers thereof, such as alkylene-alkyl acrylate copolymers, are quite flammable.

To date, these polyolefins are rendered flame retardant, in commercial applications, primarily by using a synergistic mixture of a halogen containing compound in admixture with an organic or inorganic antimony compound, e.g. antimony oxide. This mixture of halogen containing compound and antimony oxide is a very effective commercial flame retardant and does not reduce the desirable properties of the polyolefins. However, there are several disadvantages in the use of antimony oxide in the flame retardant polyolefin formulation. These disadvantages include: dense smoke production on burning; acidic and corrosive gas evolution on burning; existence of afterglow on burning; handling problems because of its known toxicity, as well as its high cost.

Therefore, a need exists to develop new flame retardants for polyolefins which will render it flame retardant without the undesirable characteristics attributable to antimony oxide. Also, to be effective, any such flame retardant additive(s) should not reduce the desirable physical properties of polyolefins.

SUMMARY OF THE INVENTION

It has now been found that alkylene-alkyl acrylate containing compositions can be rendered flame retardant by employing therein a halogenated flame retardant additive and at least one of a calcium or magnesium oxide, carbonate, hydroxide, or sulfate. This composition does not produce dense smoke upon burning; acidic and corrosive gas evolution and afterglow is reduced on burning, and also handling problems are reduced.

An object of this invention is to provide flame retardant alkylene-alkyl acrylate compositions.

Another object of the present invention is to provide flame retardant alkylene-alkyl acrylate compositions which have a satisfactory combination of physical, mechanical and electrical properties.

Another object of this invention is to provide a flame retardant curable alkylene-alkyl acrylate composition for wire and cable applications.

A further object of this invention is to provide a flame retardant curable alkylene-alkyl acrylate containing insulation, including semi-conductive insulation, for electrical wire and cable.

A further object of this invention is to provide flame retardant curable alkylene-alkyl acrylate compositions suitable for jacketing wire and cable.

A further object of this invention is to provide a flame retardant curable alkylene-alkyl acrylate containing insulation and jacketing for low voltage ($\leq 5000$ volts) to control wire and cable, particularly building wire and control cable.

A further object of this invention is to provide a flame retardant alkylene-alkyl acrylate composition for molding applications.

A further object of this invention is to provide a flame retardant alkylene-alkyl acrylate composition for use in film.

A further object of this invention is to provide a flame retardant alkylene-alkyl acrylate composition for coatings and adhesives.

A further object of this invention is to provide a flame retardant additive masterbatch comprising alkylene-alkyl acrylate copolymer, halogenated flame retardant additive and at least one of calcium or magnesium oxide, carbonate, hydroxide, or sulfate suitable as a flame retardant additive for polymeric materials.

These and other objects of the present invention are achieved by employing halogenated flame retardant additive and at least one of calcium or magnesium oxide, carbonate, hydroxide or sulfate in alkylene-alkyl acrylate compositions.

DESCRIPTION OF THE PREFERRED EMBODIMENTS

The flame retardant composition of the present invention comprises:

alkylene-alkyl acrylate copolymer; from about 1 to 30, and preferably from about 5 to 20 weight percent of halogenated flame retardant additive and from about 0.5 to 20, and preferably from about 2.5 to 12 weight percent of at least one of calcium or magnesium oxide, carbonate, hydroxide, or sulfate; said weight percent being based on the total weight of the composition.

ALKYLENE-ALKYL ACRYLATE COPOLYMERS

The copolymers used in the present invention comprise units corresponding to alkylene and acrylic acid or an alkyl ester of an acrylic acid. The term "alkylene" as used throughout the present specification and claims is intended to mean ethylene, propylene, and styrene. By alkyl acrylic ester for the purpose of this invention is meant an alkyl ester of an acrylic acid, as defined in Acrylic Resins, by Milton B. Horn, p. 15f., under the subtitle "Monomer Chemistry," whereunder alkyl esters of both unsubstituted acrylic acid

$(CH_2=CH-COOH)$ and simple alpha substituted acrylic acids such as those acrylic acids having a lower alkyl substituent, e.g., meth-acrylic acid

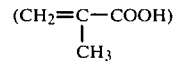

$$(CH_2=C-COOH)$$
$$|$$
$$CH_3$$

are included. Specific acrylic esters suitable for formulation of the copolymers include such as the methyl, ethyl, propyl, isopropyl, butyl, isobutyl, hexyl, t-butyl, 2-ethyl-hexyl, decyl, lauryl, and stearyl esters of acrylic or methacrylic acids. It will be obvious to those skilled in the art that the alkyl portion of the alkyl acrylate may also have, if desired, certain simple substituents which do not substantially interfere with the formation of the copolymers nor detract from their desirable properties, without departure from the scope and spirit of this invnetion. In summary, the term "alkyl acrylate" as used in the claims is intended to mean the above-described alkyl acrylic esters as well as acrylic acid. Presently, the preferred alkyl esters are the lower alkyl esters of simple acrylic acids, for example, methyl, ethyl and butyl acrylates and methacrylates.

The preferred copolymer is ethylene-ethyl acrylate copolymer containing from about 3% to about 40% by weight ethyl acrylate. The most preferred copolymer is ethylene-ethyl acrylate copolymer containing from 5% to about 20% by weight ethyl acrylate.

The alkylene-alkyl acrylate copolymers generally have a density (ASTM 1505 test procedure with conditioning as in ASTM D-148-72) of about 0.92 to 0.94 and a melt index (ASTM D-1238 at 44 psi. tested pressure) of about 0.5 to 500 decigrams per minute, preferably from about 1 to 20 decigrams per minute.

CURING AGENT

The alkylene-alkyl acrylate copolymers may include curable copolymers which are cured with high-energy electron beams or through the use of chemical curing agents.

The art of electron beam crosslinking is so highly developed that one skilled in the art is very familiar with this procedure.

The chemical curing agent is preferably an organic peroxide. The organic peroxide curing agent which can be used in the present invention includes all organic peroxides which are capable of providing free radicals for cross-linking the polymer under the cross-linking conditions employed for the compositions.

The organic peroxide compounds can be used individually or in combination with one another.

The preferred organic peroxide compounds which may be used in the compositions of the present invention may also be generally classified as those in which each oxygen atom of each peroxide group is directly bonded to a tertiary carbon atom whose remaining valences are attached to hydrocarbon radicals selected from the group consisting of alkyl, cycloalkyl, aryl and aralkyl. Peroxides of this type are generally disclosed in U.S. Pat. No. 2,888,424. Examples of the organic peroxide compounds which may be used in the vulcanizable compositions of the present invention would include
di-α-cumyl peroxide
2,5-dimethyl-2,5-di(t-butyl peroxy)-hexyne-3
2,5-dimethyl-2,5-di(t-butyl peroxy)-hexane
t-butyl cumyl peroxide
di-t-butyl peroxide
α,α'-bis(t-butyl peroxy)-p-di-isopropyl benzene
2,5-dimethyl-2,5-di(benzoyl peroxy)-hexane
t-butyl peroxy isopropyl carbonate.
Additionally, organic hydroperoxide compounds, which are disclosed in U.S. Pat. Nos. 3,954,907 and 4,018,852, are suitable for use in the present invention. Also, cross-linking aids (or boosters) for peroxides such as allyl compounds, for example, triallyl cyanurate, may be used herein.

The organic peroxide compounds are used in cross-linking effective amounts in the compositions of the present invention which may range from about 0.05 to 4.0 weight percent, and preferably about 0.15 to 2.5 weight percent, of organic peroxide based on the total weight of the composition.

CALCIUM OR MAGNESIUM OXIDE, CARBONATE, HYDROXIDE, OR SULFATE

The calcium or magnesium oxides, carbonates, hydroxides, or sulfates of the present invention are commercially available in different forms and grades.

The calcium or magnesium oxides, carbonates, hydroxides, or sulfates may be optionally coated with any compatible hydrophobic materials. The preferred coating materials are metallic salts of fatty acids and organosilanes.

The metallic salts of the fatty acids that can be employed herein are selected from the Periodic Table of the Elements, Group Ia, IIa, or IIb metal salts, of saturated or unsaturated monobasic or dibasic, branched or straight chain fatty acids of 8–20 carbon atoms. Such acids that may be included within the practice of this invention, but are not limited thereto, are palmitic, stearic, lauric, oleic, pimelic, sebacic, adipic, ricinoleic, and palmitoleic. The preferred acid is stearic acid. The preferred metal salts are calcium stearate and zinc stearate.

The organosilanes are preferably alkoxy silanes selected from the group consisting of lower alkyl alkoxy silane, alkenyl alkoxy silane, alkynyl alkoxysilane, alkyl aryl alkoxy silane, alkenyl aryl alkoxy silane, and alkynyl aryl alkoxy silane. Suitable alkoxy silanes include, for example, methyl triethoxy silane, methyl tris(2-methoxyethoxy)silane, dimethyldiethoxy silane, allyltrimethoxy silane, and the vinyl silanes such as vinyl tris(2-methoxyethoxy)silane, vinyl trimethoxy silane, and vinyl triethoxy silane.

The calcium or magnesium oxides, carbonates, hydroxides or sulfates are generally coated with from about 0.05 to about 5.0 parts of compatible hydrophobic materials per 100 parts of the magnesium oxide, carbonate, hydroxide or sulfate.

The calcium or magnesium oxides, carbonates, hydroxides or sulfates are used in amounts of from 0.5 to 20 weight percent and preferably from 2.5 to 12 weight percent based on the total weight of the composition.

HALOGENATED FLAME RETARDANT ADDITIVES

The halogenated flame retardant additives which are useful in this invention are well known to those skilled in the art. These flame retardant additives comprise halogenated (brominated or chlorinated) organic compounds. The preferred halogenated organic compounds include chlorinated polyethylene, polyvinyl chloride, polyvinyl chloride copolymers, halogenated parafin waxes, chlorinated alicyclic hydrocarbons, and brominated aromatic compounds, while the most preferred include decabromodiphenyl oxide and compounds of the following formulae:

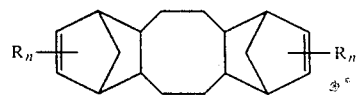

-continued

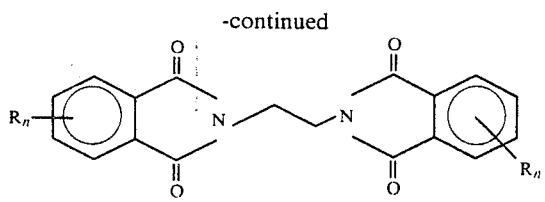

wherein R is independently chlorine or bromine and n is an integer from 1 to 6.

In general, the additive can be used individually or in combination and is used in amounts of from about 1 to 30 weight percent and preferably, from about 5 to 20 weight percent, based on the total weight of the composition.

ANTIOXIDANT

The compositions of the present invention also advantageously include about 0.01 to 3.0 weight percent and preferably, 0.05 to 1.0, weight percent, based on the total weight of the composition of one or more suitable high temperature antioxidants for the alkylene-alkyl acrylate copolymer.

These antioxidants are preferably sterically hindered phenols. Such compounds would include
1,3,5-trimethyl-2,4,6-tris(3,5-di-tertiary butyl-4-hydroxy benzyl)benzene;
1,3,5-tris(3,5-di-tertiary butyl-4-hydroxy benzyl)-5-triazine-2,4,6-(1H,3H,5H)trione;
tetrakis-[methylene-3-(3′,5-di-t-butyl-4′-hydroxy phenyl)-propionate]methane; and
di(2-methyl-4-hydroxy-5-t-butyl phenyl)sulfide.
1,2-dihydro-2,2,4-trimethylquinoline.

Polymerized 2,2,4-trimethyl dihydroquinoline may also be used.

The antioxidants may be used individually, or in combination with one another.

CARBON BLACK

The compositions of the present invention also advantageously include all electrically conductive carbon blacks, including furnace blacks, acetylene blacks, and channel blacks. The carbon should have a particle size of the order of about 10 to about 60 millimicrons and a $N_2$ surface area of about 10 to 1100 m$^2$/g. About 1 to about 30, and preferably from about 2 to about 20 weight percent based on the total weight of the composition, of the carbon black is used.

ADJUVANTS

In addition to the alkylene-alkyl acrylate copolymer, halogenated flame retardant additive and calcium or magnesium oxide, carbonate, hydroxide or sulfate, the composition of the present invention may also contain other adjuvants of the types normally used in molding compositions, curable compositions, film, coatings and adhesives.

These other adjuvants would include fillers such as talc, particularly talc (in an amount of from 25 to about 150 parts per 100 parts of copolymer) coated with at least one metallic salt of a fatty acid (in an amount of from 0.50 to about 2.0 parts per 100 parts of talc) having 8–20 carbon atoms as described in copending application Ser. No. 899,563 pending in group 290 of M. J. Keogh filed May 18, 1978, titled A Polyethylene Composition Containing Talc Filler For Electrical Application, and assigned to the same assignee as the present invention; blowing agents; nucleating agents for blown systems; lubricants; UV stabilizers; dyes and colorants; voltage stabilizers; metal deactivators; coupling agents, and the like.

These adjuvants would be used in amounts designed to provide the intended effect in the resulting composition.

The total amount of adjuvants used will range from 0 to about 60 weight percent based on the total weight of the composition.

FLAME RETARDANT

A masterbatch containing alkylene-alkyl acrylate copolymer, halogenated flame retardant additive and at least one calcium or magnesium oxide, carbonate, hydroxide or sulfate, may be prepared by blending together 100 weight parts of alkylene-alkyl acrylate copolymer containing from about 5 to 60 weight percent of alkyl acrylate, from 20 to 100 weight parts of halogenated flame retardant additive and from about 20 to 100 weight parts of at least one calcium or magnesium oxide, carbonate, hydroxide or sulfate. Such a masterbatch is a suitable flame retardant additive for any polymeric material compatible with alkylene-alkyl acrylate copolymer. The preferred polymers include thermoplastic polymers such as polyethylene, polypropylene, ethylene vinyl acetate, polystyrene and copolymers thereof such as styrene acrylonitrile, and butadiene styrene-acrylonitrile terpolymers.

This flame retardant masterbatch is added to the polymeric material in amounts of from about 10 to 50 weight percent, based on the total weight of the composition.

PROCESSING OF THE COMPOSITIONS

All of the components of the present invention are usually blended or compounded together prior to their formulation as coatings and adhesives or prior to their introduction into an extrusion device. The alkylene-alkyl acrylate copolymer and the other desired constituents may be blended together by any of the techniques used in the art to blend and compound thermoplastics to homogeneous masses. Prior to blending the constituents together, the calcium or magnesium oxide, carbonate, hydroxide, or sulfate may be coated by known techniques. As regards blending, for instance, the components may be fluxed on a variety of apparatus including multi-roll mills, screw mills, continuous mixers, compounds extruders and Banbury mixers, or dissolved in mutual or compatible solvents.

When all the solid components of the composition are available in the form of a powder, or as small particles, the compositions are most conveniently prepared by first making a blend of the components, say in a Banbury mixer or a continuous extruder, and then masticating this blend on a heated mill, for instance a two-roll mill, and the milling continued until an intimate mixture of the components is obtained.

Where the copolymer is not available in powder form the compositions may be made by introducing the copolymer to the mill, masticating it until it forms a band around roll, after which a blend of the remaining components is added and the milling continued until an intimate mixture is obtained. The rolls are preferably maintained at a temperature which is within the range of 80° C. to 135° C. and which is below the decomposition temperatures of the peroxide compound(s) if such are used. The composition, in the form of a sheet, is removed from the mill and then brought into a form, typically dice-like pieces, suitable for subsequent processing.

After the various components of the compositions of the present invention are uniformly admixed and blended together, they are further processed, in accordance with the process of the present invention, in conventional extrusion apparatus. For example, the compositions may then be extruded onto a wire or cable, or other substrate. If the compositions of the present invention, are chemically curable, they are extruded onto the wire or cable, or other substrate and vulcanized at elevated temperatures of about >180° C. and preferably at >200°-230° C. using conventional vulcanizing procedures.

The following examples are merely illustrative of the present invention and are not intended as a limitation on the scope thereof.

EXAMPLES 1 AND 2

The compositions of these Examples were prepared by mixing all of the components together in a Brabender Plasticord mixer preheated to 120° C. The components were mixed until homogeniety was achieved. The temperature was maintained below 135° C. The formulations of the compositions are set forth in Table I as follows:

TABLE I

| Example | 1 | 2 |
|---|---|---|
| Ethylene-ethyl acrylate copolymer[a] | 54.0 | 52.8 |
| Talc[b] | 23.5 | 21.4 |
| Flame retardant[c] | 11.5 | 14.9 |
| Calcium carbonate | 8.5 | 8.1 |
| Antioxidant[d] | 0.7 | 0.7 |
| Peroxide[e] | 1.8 | 1.8 |
| | 100 | 100 |

[a]15-17 percent by weight ethyl acrylate, Melt Index 1.2
[b]Coated with zinc stearate
[c]In example 1 the flame retardant was decabromodiphenyl oxide containing 83 percent bromine; In example 2 the flame retardant was

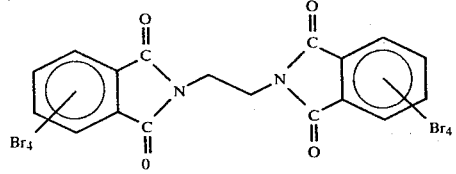

(contains 67 percent bromine)
[d]1,2-dihydro-2,3,4 trimethylquinoline
[e]di-α-cumyl peroxide.

The compositions in Table I were processed into test specimens as required by the following test procedures and subjected to the following tests: Density ASTM-D-1505-68; Tensile strength and elongation and tensile strength and elongation under heat aging conditions of 121° C. for one week; 158° C. for one week and 150° C. for 2 weeks, ASTM-D-412-68; Secant modulus, ASTM-D-882,758; Deformation ASTM-D-621; Low temperature brittleness ASTM-D-1790-62 (cold crack); and Monsanto Rheometer Cure. [This test procedure is fully set forth in U.S. Pat. No. 4,018,852 issued Apr. 19, 1977. Briefly, FIG. 1 of said patent shows the typical Monsanto rheometer curve. The optimum cure level (highest crosslink density) is designated as H. It is measured in terms of inch-pounds of torque on the rheometer test equipment. A higher value for H corresponds to a higher cross-link density. The time, in minutes, required to reach 90% of the maximum cure (H) is designated as $C_t$. The scorch time, $S_t$, is defined as the point in time, in minutes, at which the curve reaches a rheometer level of 10 inch-pounds of torque on the upswing of the curve. In general, one is interested in getting to the maximum cure (H) as soon as possible. In other words, a short $C_t$ is desirable. At the same time, one would like $S_t$ to be as long as possible since a longer $S_t$ means the vulcanizable composition being evaluated can be processed at higher speed or at a higher temperature. That is, it would be less scorchy.]

The results are set forth in Table II as follows:

TABLE II

| Example | 1 | 2 | UL Subject 44 Requirement |
|---|---|---|---|
| Density | 1.326 | 1.313 | — |
| Tensile strength, psi | 2310 | 2420 | 1500 |
| Elongation, percent | 460 | 470 | 150 |
| Tensile strength, percent retained (1 wk at 121° C.) | 100 | 100 | 75 |
| Elongation, percent retained (1 wk at 121° C.) | 82.5 | 99 | 75 |
| Tensile strength, percent retained (1 wk at 158° C.) | 100 | 97 | None |
| Elongation, percent retained (1 wk at 158° C.) | 21 | 60 | None |
| Tensile strength, percent retained (2 wks at 150° C.) | 100 | 82 | None |
| Elongation, percent retained (2 wks at 150° C.) | 30 | 78 | None |
| Modulus, psi | 19,500 | 20,000 | None |
| Deformation, percent | 22.7 | 23.0 | None |
| Low Temp Brittleness | −37 | −37 | −25 |
| Rheometer, lb-in | 71 | 72 | None |

A No. 14 AWG solid copper wire was coated with the compositions of Examples 1 and 2 to give a 30 mil thickness. The following electrical properties of this coating were measured: Dielectric constant, 60 cycle and Dissipation factor, 60 cycle according to ASTM-D-150-74; Insulation resistance constant at 15.6° C. according to UL Subject 44; Specific inductance capacitance, at 90° C. for 1 hour, 24 hours, 1 week and 2 weeks according to UL Subject 44; Insulation Resistance at 24 hours, 1 week and 5 weeks according to UL Subject 44.

The results are set forth in Table III as follows:

TABLE III

| Example | | 1 | 2 | UL Subject 44 Requirement |
|---|---|---|---|---|
| Dielectric constant, 60 cycle | | 4.264 | 3.454 | |
| Dissipation factor, 60 cycle | | 0.0802 | 0.0292 | |
| Insulation resistance constant | | 14,800 | 47,300 | |
| Specific Inductance Capacitance | @ 1 hour | 5.350 | 3.802 | ≦6.0 |
| | 24 hours | 5.171 | 3.680 | |
| | 1 week | 5.176 | 3.698 | |
| | 2 week | 5.170 | 3.690 | |
| Insulation resistance (Megohms/1000 ft) | 24 hours | 23.1 | 262 | ≧0.15 |
| | 1 week | 25.1 | 266 | |
| | 5 weeks | — | 384 | |

The data show that the compositions of the present invention have acceptable mechanical properties (Table I) and far surpass the requirements of UL Subject 44 (Table II).

EXAMPLES 3 TO 5

The compositions of these Examples were prepared by the methods as in the previous Examples. The formulation of the compositions are set forth in Table IV as follows:

TABLE IV

| Example | 3 | 4 | 5 |
|---|---|---|---|
| Ethylene-ethyl acrylate Copolymer[a] | 54.7 | 54.7 | 55.3 |
| Talc[b] | 19.2 | 19.2 | 22.8 |
| Flame retardant[c] | 16.1 | 16.1 | 10.6 |
| Magnesium oxide | 7.4 | — | — |
| Antimony oxide | — | 7.4 | 8.5 |
| Antioxidant[d] | 0.5 | 0.5 | 0.7 |
| Peroxide[e] | 2.1 | 2.1 | 2.1 |
| | 100 | 100 | 100 |

[a]15-17 percent by weight ethyl acrylate; Melt index 1.2
[b]Coated with zinc stearate
[c]Flame retardant in Examples 3 and 4 is the same as in Example 2. In Example 5 the flame retardant is Decabromodiphenyl oxide containing 83 percent bromide.
[d]1,2-dihydro-2, 3, 4 trimethylquinoline
[e]dl-α-cumyl peroxide The compositions of Examples 1 to 5 were processed into test specimens as required by the following test procedure and subjected to the following test procedure: Limiting oxygen index, ASTM D-2863-70.

The results are set forth in Table V as follows:

TABLE V

| Example | 1 | 2 | 3 | 4 | 5 |
|---|---|---|---|---|---|
| Limiting Oxygen Index | 26.2 | 26.8 | 27.9 | 27.9 | 28.0 |

The data of Table V show that flame retardant compositions of the present invention containing calcium carbonate (Examples 1 and 2) and magnesium oxide (Example 3) have flame retardant properties similar to compositions containing antimony oxide (Examples 4 and 5). Also, the compositions of the present invention produce less dense smoke and minimal corrosive gases upon burning as compared to compositions containing antimony oxide.

EXAMPLES 6 TO 9

The compositions of these Examples were prepared by the methods as in the previous Examples. The formulations of the compositions are set forth in Table VI as follows:

TABLE VI

| | 6 | 7 | 8 | 9 |
|---|---|---|---|---|
| Ethylene-Ethyl Acrylate Copolymer[a] | 55 | — | 57.3 | 57.3 |
| Ethylene-Vinyl Acetate Copolymer[b] | — | 55 | — | — |
| Talc[c] | 24.4 | 24.4 | 22.1 | 30.1 |
| Magnesium oxide | 8.0 | 8.0 | 18.0 | — |
| Flame Retardant[d] | 10.0 | 10.0 | — | 10.0 |
| Antioxidant[e] | 0.5 | 0.5 | 0.5 | 0.5 |
| Peroxide[f] | 2.1 | 2.1 | 2.1 | 2.1 |
| | 100 | 100 | 100 | 100 |

[a]15-17 percent by weight ethyl acrylate; Melt Index 1.2
[b]10 percent by weight vinyl acetate; Melt Index 2.0
[c]Coated with zinc stearate
[d]Decabromodiphenyl oxide containing 83 percent bromine
[e]1,2-dihydro-2, 3, 4 trimethylquinoline
[f]di-α-cumyl peroxide The compositions were subjected to the limiting oxygen index test as previously described.

The results are set forth in Table VII as follows:

TABLE VII

| Example | 6 | 7 | 8 | 9 |
|---|---|---|---|---|
| Limiting Oxygen Index | 30.6 | 23.8 | 23.4 | 24.2 |

The data show that magnesium oxide is not an acceptable flame retardant in ethylene-vinyl acetate copolymers (Example 7) due to the low value, 23.8, of the limiting oxygen index. Also, the data shows that an ethylene-ethyl acrylate composition of the present invention containing both magnesium oxide and flame retardant (Example 6) has a higher limiting oxygen index value, 30.6, than the combination of an ethylene-ethyl acrylate composition containing only magnesium oxide, 23.4, (Example 8) and an ethylene-ethyl acrylate composition containing only flame retardant, 24.2, (Example 9). Thus, the combination of magnesium oxide and flame retardant exhibits a synergistic effect in ethylene-ethyl acrylate containing compositions.

EXAMPLES 10 AND 11

The compositions of these Examples were prepared by the methods as in the previous Examples. The formulations of the compositions are set forth in Table VIII as follows:

TABLE VIII

| Example | 10 | 11 |
|---|---|---|
| Ethylene-Ethyl Acrylate Copolymer[a] | 53.9 | 54.0 |
| Talc[b] | 19.3 | 23.2 |
| Magnesium oxide | 8.5 | 8.5 |
| Flame retardant[c] | 16.0 | 12.1 |
| Antioxidant[d] | 0.7 | 0.7 |
| Peroxide[e] | 1.6 | 1.5 |
| | 100 | 100 |

[a]15-17 percent by weight ethyl acrylate; Melt Index 1.2
[b]Coated wih zinc stearate
[c]Flame retardant of Example 10 is the same as that of Example 2, while the flame retardant of Example 11 is the same as that of Example 1.
[d]1,2-dihydro-2,3,4 trimethylquinoline
[e]di-α-cumyl peroxide The compositions of Table VIII were processed into test specimens as required by the following test procedures and subjected to the following test (as fully described in Examples 1 and 2, supra): Density; Tensile strength and elongation and tensile strength and elongation under heat aging condition of 121° C. for one week; Secant modulus; Deformation; Low temperature brittleness and Monsanto Rheometer Cure.

The results are set forth in Table IX as follows:

TABLE IX

| Example | 10 | 11 | UL Subject 44 Requirement |
|---|---|---|---|
| Density | 1.28 | 1.28 | — |
| Tensile strength, psi | 1670 | 1890 | 1500 |
| Elongation, percent | 490 | 540 | 150 |
| Tensile strength, percent retained (1 week at 121° C.) | 95 | 87 | 75 |
| Elongation, percent retained (1 week at 121° C.) | 82 | 83 | 75 |
| Modulus, psi | 18600 | 16700 | None |
| Deformation, percent | 22 | 21 | None |
| Low Temp Brittleness | −39 | −47 | −25 |

TABLE IX-continued

| Example | 10 | 11 | UL Subject 44 Requirement |
|---|---|---|---|
| Rheometer, lb-in | 42 | 44 | None |

A No. 14 AWG solid copper wire was coated with the compositions of Examples 10 and 11 to give a 30 mil thickness. The following electrical properties (the test procedures fully described in Examples 1 and 2) of the coating were measured: Dielectric constant and Dissipation factor, 60 cycles; Insulation resistance constant at 15.6° C.; Specific inductance capacitance at 90° C. for 1 hour, 24 hours, 1 week and 2 weeks; Insulation Resistance at 24 hours, 1 week, 2 weeks and 4 weeks.

The results are set forth in Table X as follows:

TABLE X

| Example | | 10 | 11 | UL Subject 44 Requirement |
|---|---|---|---|---|
| Dielectric constant, 60 cycle | | 3.265 | 3.666 | |
| Dissipation factor, 60 cycle | | 0.0232 | 0.0313 | |
| Insulation resistance constant | | 25,000 | 44,000 | |
| Specific Inductance Capacitance | @1 hour | 4.106 | 5.171 | ≦6.0 |
| | 24 hours | 3.836 | 4.480 | |
| | 1 week | 3.569 | 4.434 | |
| | 2 weeks | 3.443 | 4.347 | |
| Insulation resistance (megohms/1000 ft) | @24 hours | 248 | 352 | ≧0.15 |
| | 1 week | 238 | 214 | |
| | 2 weeks | 200 | 45 | |
| | 4 weeks | 138 | 355 | |

The data show that the compositions of the present invention have acceptable mechanical properties (Table IX) and far surpass the requirement of UL Subject 44 (Table X).

EXAMPLES 12 TO 15

The compositions of these Examples were prepared by the methods as in the previous Examples. The formulation of the compositions are set forth in Table XI as follows:

TABLE XI

| Example | 12 | 13 | 14 | 15. | 16 |
|---|---|---|---|---|---|
| Ethylene-Ethyl Acrylate Copolymer[a] | 55.3 | 55.3 | 55.3 | 55.3 | 54.0 |
| Talc[b] | 22.8 | 22.8 | 22.8 | 22.8 | 24.7 |
| Flame retardant[c] | 10.6 | 10.6 | 10.6 | 10.6 | — |
| Calcium carbonate | 8.5 | — | — | — | — |
| Calcium oxide | — | 8.5 | — | — | — |
| Calcium hydroxide | — | — | 8.5 | — | — |
| Calcium sulphate | — | — | — | 8.5 | — |
| Calcium chloride (anhydrous) | — | — | — | — | 18.6 |
| Antioxidant[d] | 0.7 | 0.7 | 0.7 | 0.7 | 0.7 |
| Peroxide[e] | 2.1 | 2.1 | 2.1 | 2.1 | 2.0 |
| | 100 | 100 | 100 | 100 | 100 |

[a]14–16 weight percent ethyl acrylate; Melt Index 1.7
[b]Coated with zinc stearate
[c]Decabromodiphenyl oxide containing 83 percent bromine
[d]1,2-dihydro-2,3,4 trimethylquinoline
[e]di-α-cumyl peroxide The compositions were subjected to the limiting oxygen index test as previously described.

The results are set forth in Table XII as follows:

TABLE XII

| Example | 12 | 13 | 14 | 15 | 16 |
|---|---|---|---|---|---|
| Limiting Oxygen Index | 29.3 | 28.9 | 29.1 | 26.0 | 23.4 |

The data of Table XII show that calcium carbonate (Example 12), calcium oxide (Example 13) and calcium hydroxide containing compositions (Example 14) all have high limiting oxygen index values, while the limiting oxygen index value of the calcium sulphate containing composition (Example 15) is acceptable at 26.0 while the calcium chloride containing composition (Example 16) has an unacceptable limiting oxygen index value of 23.4.

EXAMPLES 17 TO 23

The compositions of these Examples were prepared by the methods as in the previous Examples. The formulations of the compositions are set forth in Table XIII as follows:

TABLE XIII

| Example | 17 | 18 | 19 | 20 | 21 | 22 | 23 |
|---|---|---|---|---|---|---|---|
| Ethylene-Ethyl Acrylate Copolymer[a] | 55.3 | 55.3 | 55.3 | 55.3 | 55.3 | 55.3 | 53.2 |
| Talc[b] | 22.8 | 22.8 | 22.8 | 22.8 | 22.8 | 22.8 | 21.4 |
| Flame retardant[c] | 10.6 | 10.6 | 10.6 | 10.6 | 10.6 | 10.6 | 14.9 |
| Magnesium oxide | 8.5 | — | — | — | — | — | — |
| Magnesium hydroxide | — | 8.5 | — | — | — | — | — |
| Magnesium carbonate | — | — | 8.5 | — | — | — | — |
| Zinc oxide | — | — | — | 8.5 | — | — | — |
| Barium oxide | — | — | — | — | 8.5 | — | — |
| Antimony oxide | — | — | — | — | — | 8.5 | — |
| Sodium carbonate | — | — | — | — | — | — | 8.1 |
| Antioxidant[d] | 0.7 | 0.7 | 0.7 | 0.7 | 0.7 | 0.7 | 0.7 |
| Peroxide[e] | 2.1 | 2.1 | 2.1 | 2.1 | 2.1 | 2.1 | 1.7 |
| | 100 | 100 | 100 | 100 | 100 | 100 | 100 |

[a]15–17 weight percent ethyl acrylate; Melt Index 1.2
[b]Coated with zinc stearate
[c]Decabromodiphenyl oxide containing 83 percent bromine was used in Examples 17 to 22 and the flame retardant of Example 2 was used in Example 23
[d]1,2-dihydro-2,3,4 trimethylquinoline
[e]di-α-cumyl peroxide The compositions were subjected to the limiting oxygen index test as previously described.

The results are set forth in Table XIV as follows:

TABLE XIV

| Example | 17 | 18 | 19 | 20 | 21 | 22 | 23 |
|---|---|---|---|---|---|---|---|
| Limiting Oxygen Index | 28.3 | 28.3 | 28.5 | 24.9 | 25.1 | 28.0 | 23.4 |

The data of Table XIV show that ethylene-ethyl acrylate compositions containing zinc oxide (Example 20) barium oxide (Example 21) and sodium carbonate (Example 23) are not acceptable due to their low limiting oxygen index values (24.9, 25.1 and 23.4 respectively). The data also show that magnesium oxide, magnesium hydroxide and magnesium carbonate, ethylene-ethyl acrylate containing compositions, of the present invention have limiting oxygen index values which are comparable with ethylene-ethyl acrylate compositions containing antimony oxide.

EXAMPLES 24 TO 27

The compositions of these Examples were prepared by the methods as in the previous Examples. The formulations of these compositions are set forth in Table XV.

TABLE XV

| Example | 24 | 25 | 26 | 27 |
|---|---|---|---|---|
| Ethylene-Ethyl Acrylate Copolymer[a] | 53.2 | 53.2 | — | — |
| Polyethylene[b] | — | — | 53.0 | 53.0 |
| Talc[c] | 21.4 | 21.4 | 21.5 | 21.5 |
| Flame retardant[d] | 14.9 | 14.9 | 14.9 | 14.9 |
| Magnesium oxide | — | 8.1 | — | 8.1 |
| Calcium carbonate | 8.1 | — | 8.1 | — |
| Antioxidant[e] | 0.7 | 0.7 | 0.7 | 0.7 |
| Peroxide[f] | 1.7 | 1.7 | 1.8 | 1.8 |
|  | 100 | 100 | 100 | 100 |

[a]2 percent by weight of ethyl acrylate; Melt Index 2.2
[b]Union Carbide DYNH-265; Melt Index 2.0; Density 0.919
[c]Coated with zinc stearate
[d]Flame retardant of Example 2
[e]1,2-dihydro-2,3,4 trimethylquinoline
[f]di-α-cumyl peroxide The compositions were subjected to the limiting oxygen index test as previously described.

The results are set forth in Table XVI as follows:

TABLE XVI

| Example | 24 | 25 | 26 | 27 |
|---|---|---|---|---|
| Limiting Oxygen Index | 22.8 | 23.8 | 22.2 | 24.0 |

The data show that magnesium oxide and calcium carbonate are not acceptable in compositions containing polyethylene (Examples 26 and 27) and ethylene-ethyl acrylate copolymer containing ethyl-acrylate at 2.0 weight percent (Examples 24 and 25) due to their low limiting oxygen index values.

EXAMPLES 28 TO 31

The compositions of these Examples were prepared by the methods as in the previous Examples. The formulations of these compositions are set forth in Table XVII as follows:

TABLE XVII

| Example | 28 | 29 | 30 | 31 |
|---|---|---|---|---|
| Ethylene-Ethyl Acrylate Copolymer[a] | 53.9 | 51.9 | 51.9 | — |
| Ethylene-Vinyl Acetate Copolymer[b] | — | — | — | 56.2 |
| Talc[c] | 19.4 | 21.2 | 25.1 | 15.8 |
| Flame retardant[d] | 16.0 | 16.0 | 12.1 | 17.4 |
| Magnesium oxide | 8.5 | — | — | — |
| Calcium carbonate | — | 8.7 | 8.7 | — |
| Antimony oxide | — | — | —8.1 | 8.1 |
| Antioxidant[e] | 0.7 | 0.7 | 1.7 | 0.5 |
| Peroxide[f] | 1.5 | 1.5 | 1.5 | 2.0 |
|  | 100 | 100 | 100 | 100 |

[a]15-17 percent by weight ethyl acrylate; Melt Index 1.2
[b]10 percent by weight vinyl acetate; Melt Index 2.0
[c]Talc was coated with zinc stearate
[d]In Examples 28 and 29 the flame retardant was the same as in Example 2; in Example 30 the flame retardant was decabromodiphenyloxide containing 83 percent bromine; in Example 31 the flame retardant was of the following formula:

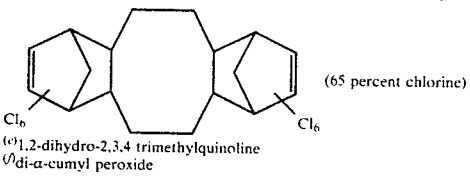
(65 percent chlorine)

[e]1,2-dihydro-2,3,4 trimethylquinoline
[f]di-α-cumyl peroxide

The compositions were subjected to a smoke test as fully described in Flammability of Solid Plastics, Vol. 7, Fire and Flammability Series, Technomic Publishing Co. Inc. Westport, Conn., 1974, pages 86–89. The test method is described as follows:

The apparatus consists of a metal box 36 in. high × 36 in. wide × 24 in. deep. It is equipped with a glass door on the right-hand side of the front and an exhaust system on the left side near the top rear. The test specimen, nominally 3 × 3 × ¼ in., is mounted in a stainless steel frame and held in place by an asbestos board backing and a spring clip. Specimens are wrapped in foil with the face cut away, to prevent smoke from leaking through the back of the sample holder. The sample area exposed is 2.56 × 2.56 in. (6.56 in.$^2$). The heat is supplied radiantly from a horizontally mounted 500-W electric heater, suitably enclosed and controlled. A frame containing horizontal rods is attached in front of the heater, so that channels attached to the sample holders will permit the samples to be slid (in the vertical position) in front of or away from the direct radiation.

An air-cooled, Gardon-foil radiometer, mounted in a frame similar to the sample holder, can also be slid in front of or away from the heater. The sample and radiometer faces are positioned 1½ in. from the face of the heater housing.

A small rotatable gas jet (0.3 scf/hr of 1000-Btu gas) is used optionally to induce ignitions in those cases where flaming exposure is desired. In use, the flame impinges on the lower center face of the test samples.

The smoke obscuration is measured by means of a vertical light beam (top) and photocell system (bottom), the output of which is fed to a recorder through a decade selector switch.

In operation, the heater is adjusted to yield a flux of 2.5 W/cm$^2$ on the radiometer face, the light source is adjusted to 100 percent transmission, the sample is positioned on the rods, and the door is closed. The test is started by sliding the sample in front of the heater, starting the recorder and a timer, shutting off the air supply to the radiometer, and (optionally) rotating the previously lit gas jet into position. The test is continued until the light transmission reaches a minimum and reverses itself.

The results from the chamber is calculated in terms of specific optical density ($D_s$), obscuration time ($T_{16}$), and Smoke Obscuration Index (SOI) by means of the following equations:

$$D_s = \frac{V}{AL} \log_{10}\left(\frac{100}{T}\right)$$

$$SOI = \frac{D_m^2}{20 \times 100 \times T_{16}} \left( \frac{1}{t_{90} - t_{70}} + \frac{1}{t_{70} - t_{50}} + \frac{1}{t_{50} - t_{30}} + \frac{1}{t_{30} - t_{10}} \right)$$

where

All in consistent units $T$ = percent light transmission at any time $t$;

$D$ = optical density = $\log_{10}\left(\frac{100}{T}\right)$;

$V$ = room or chamber volume
$A$ = area releasing smoke (sample face area)
$L$ = light path through the smoke or viewing distance from an exit sign
$D_s$ = specific optical density; i.e., optical density for smoke evolving from a sample of unit face area into a chamber of a unit volume and viewed through a light path of unit length;
$D_m$ = maximum specific optical density ($D_s$) obtained in a test; and -continued $T_{16}$ = time for smoke to reach a critical (i.e., vision-obscuring) density;

$t_{90}, t_{70}$, etc. = time for $D_S$ to reach 90 percent, 70 percent, etc., of $D_m$.

Note that the SOI equates the visibility hazard to the product of the maximum smoke density and the average rate of density accumulation divided by the obscuration time. The SOI also includes an artificial factor of 1/100.

The value of $D_S$ for the compositions of Examples 28 to 31 are set forth in Table XVIII as follows:

TABLE XVIII

| Example | 28 | 29 | 30 | 31 |
|---|---|---|---|---|
| $D_S$ | 284.03 | 188.53 | 248.00 | 463.03 |

The data show that the flame retardant compositions of the present invention containing magnesium oxide or calcium carbonate (Examples 28 to 30) generate far less smoke ($D_S$ values of 284.03, 188.53 and 248.00) than a flame retardant composition containing antimony oxide (Example 31) which has a $D_S$ value of 463.03.

What is claimed is:

1. A flame retardant alkylene-alkyl acrylate copolymer composition comprising alkylene-alkyl acrylate copolymer, from about 1 to 30 weight percent of halogenated flame retardant additive and from about 0.5 to 20 weight percent of at least one of calcium or magnesium oxide, carbonate, hydroxide or sulfate; said weight percents based on the total weight of the composition.

2. A composition as in claim 1 wherein the alkylene-alkyl acrylate copolymer is ethylene-ethyl acrylate copolymer.

3. A composition as in claim 2 wherein the ethylene-ethyl acrylate copolymer contains from about 3 percent to about 40 percent by weight ethyl acrylate.

4. A composition as in claim 3 which contains calcium carbonate.

5. A composition as in claim 3 which contains calcium oxide.

6. A composition as in claim 3 which contains calcium hydroxide.

7. A composition as in claim 3 which contains calcium sulfate.

8. A composition as in claim 3 which contains magnesium oxide.

9. A composition as in claim 3 which contains magnesium hydroxide.

10. A composition as in claim 3 which contains magnesium carbonate.

11. A composition as in claim 1 which contains from about 5 to 20 weight percent of halogenated flame retardant additive, based on the total weight of the composition.

12. A composition as in claim 1 which contains from about 2.5 to 12 weight percent of calcium or magnesium oxide, carbonate, hydroxide or sulfate, based on the total weight of the composition.

13. A composition as in claim 1 wherein the calcium or magnesium oxide, carbonate, hydroxide or sulfate is coated with a metallic salt of a fatty acid or an organosilane.

14. A composition as in claim 1 which contains a filler.

15. A composition as in claim 14 in which the filler is talc.

16. A composition as in claim 15 wherein the talc is coated with at least one metallic salt of a fatty acid having 8–20 carbon atoms.

17. A composition as in claim 1 which contains carbon black.

18. A composition as in claim 1 wherein the alkylene-alkyl acrylate copolymer is curable.

19. A flame retardant masterbatch, suitable for use as a flame retardant for polymeric material compatible with alkylene-alkyl acrylate copolymer, said masterbatch comprising 100 weight parts of alkylene-alkyl acrylate copolymer, from about 20 to 100 weight parts of halogenated flame retardant additive, and from about 20 to 100 weight parts of at least one calcium or magnesium oxide, carbonate, hydroxide or sulfate.

20. A electrical wire or cable insulated with a curable flame retardant composition comprising alkylene-alkyl acrylate copolymer, from about 1 to 30 weight precent of halogenated flame retardant additive and from about 0.5 to 20 weight percent of at least one of a calcium or magnesium oxide, carbonate, hydroxide or sulfate, said weight percents based on the total weight of the composition.

21. A composition as in claim 1 further comprising crosslinking-effective amount of organic peroxide.

22. A composition as in claim 1 further comprising crosslinking-effective amount of organic hydroperoxide.

23. A process for insulating a wire or cable comprising extruding the composition of claims 1, 2, 3, 4, 5, 6, 7, 8, 9, 10, 11, 12, 13, 14, 15, 16, 17 or 18 onto a wire or cable.

24. A process for insulating a wire or cable comprising extruding the composition of claim 21 onto a wire or cable.

25. A process for insulating a wire or cable comprising extruding the composition of claim 22 onto a wire or cable.

* * * * *

UNITED STATES PATENT AND TRADEMARK OFFICE
CERTIFICATE OF CORRECTION

PATENT NO. : 4,243,579
DATED : January 6, 1981
INVENTOR(S) : Michael John Keogh

It is certified that error appears in the above—identified patent and that said Letters Patent is hereby corrected as shown below:

Column 13, line 50; under Example 30; "8.1" should be deleted. Column 13, line 51; under Example 30; "1.7" should read --0.7--.

Signed and Sealed this

Nineteenth Day of April

[SEAL]

Attest:

GERALD J. MOSSINGHOFF

Attesting Officer — Commissioner of Patents and Trademarks